United States Patent [19]

Black

[11] 4,111,623
[45] Sep. 5, 1978

[54] APPARATUS FOR ASSEMBLING BEARING UNIT IN A WHEEL

[75] Inventor: John W. Black, Hickory Corners, Mich.

[73] Assignee: Pemco-Kalamazoo, Inc., Kalamazoo, Mich.

[21] Appl. No.: 723,926

[22] Filed: Sep. 16, 1976

[51] Int. Cl.$^2$ .............................................. B29F 1/10
[52] U.S. Cl. ................................ 425/129 R; 249/84; 249/95; 425/117; 425/576
[58] Field of Search .................. 425/117, 129 R, 576, 425/111, 125, 127; 249/84, 85, 95, 96, 97

[56] References Cited

U.S. PATENT DOCUMENTS

| | | | |
|---|---|---|---|
| 2,828,508 | 4/1958 | Labarre | 425/576 X |
| 3,005,235 | 10/1961 | Pateka | 425/576 X |
| 3,293,694 | 12/1966 | Taylor, Jr. | 249/84 X |
| 3,588,958 | 6/1971 | Metzger | 425/576 X |
| 3,667,882 | 6/1972 | Ross | 425/117 |

*Primary Examiner*—Francis S. Husar
*Assistant Examiner*—William R. Briggs
*Attorney, Agent, or Firm*—Blanchard, Flynn, Thiel, Boutell and Tanis

[57] ABSTRACT

A method and apparatus for assembling a bearing assembly having bearings therein in a wheel having a hole in the center thereof of a diameter greater than the outer periphery of the bearing assembly. A plurality of molds are provided on a turntable and are indexed between selected positions as the turntable rotates about its axis of rotation. Each of the molds on the turntable has two alignment devices therein, one alignment device being provided for aligning the axis of rotation of the bearing assembly so that it is coaxial with the central axis of the other alignment device. The other alignment device supports the wheel to effect a placement of the center of the outer diameter of the wheel in coaxial relationship with the axis of the one alignment device. A nozzle is provided on the mold and has inlets or orifices to the mold which are aligned with the spacing between the outer periphery of the bearing assembly and the wall surface of the hole in the wheel. A moldable synthetic resin material is supplied to the nozzle to effect a supply of the synthetic resin material to the spacing to cause, upon a congealing of the synthetic resin material, a securement of the bearing assembly in the hole in the wheel.

10 Claims, 13 Drawing Figures

APPARATUS FOR ASSEMBLING BEARING UNIT IN A WHEEL

FIELD OF THE INVENTION

This invention relates to a method and apparatus for assemblying a bearing assembly having bearings therein in a wheel having a hole in the center thereof and, more particularly, relates to a method and an apparatus for aligning the bearing assembly and the wheel so that the axis of rotation for the bearing assembly and the outer diameter of the wheel are coaxial prior to a securement of the bearing assembly to the wheel.

BACKGROUND OF THE INVENTION

The assembly of wheels for use in castors or the like has been a process which has incorporated many steps and which have, over the years, been considered standard procedural steps in assemblying the wheel. More specifically, wheels were placed into jigs and the bearing assembly was assembled into the hole normally provided in the center of the wheel. The assembly of the wheel necessitated that the hole normally provided in the center of the wheel be concentric with the outer diameter of the wheel. Normal manufacturing tolerances for the wheel in some cases were exceeded and after the wheel became assembled and placed into an environment, such as a shopping cart, a normal use of the nonconcentrically arranged bearing assembly and wheel would then generate a wobbling or loping as the cart was being utilized. The wobbling or loping characteristic generates a self-destructive condition on the bearings. Many efforts have been made to solve the problem of properly aligning the axis of rotation of the bearing assembly with the center of the outer diameter of the wheel but this has continued to be a problem in view of the manufacturing tolerances generally controlled by the manufacturer of the wheel. If the wheel is made of a hard rubber composition, a separate supplier for the wheel is utilized and the manufacturer of the wheel assembly generally has no control over the normal manufacturing tolerances of the wheel supplier. Thus, the manufacturer of the wheel assembly is rendered somewhat helpless in solving a problem that has existed for many years.

Accordingly, it is an object of this invention to provide a method and apparatus for assemblying a bearing assembly having bearing means therein into a hole in the center of the wheel and assuring that the axis of rotation of the bearing assembly is coaxial with the center of the outer diameter of the wheel.

It is a further object of this invention to provide a method and apparatus, as aforesaid, wherein a spacing is provided between the outer periphery of the bearing assembly and the inner wall surface of the hole in the wheel and, during assembly, aligning the center of the outer diameter of the wheel with the axis of rotation of the bearing assembly and thereafter filling the spacing with moldable, synthetic resin material to effect, upon a congealing of the moldable, synthetic resin material, a securement of the bearing assembly in the hole in the wheel and thereby assuring that the outer diameter of the wheel is concentric with the axis of rotation of the bearing assembly.

It is a further object of this invention to provide a method and apparatus, as aforesaid, utilizing a mold into which the bearing assembly and the wheel is placed to effect the proper alignment between the axis of the bearing assembly and the center of the outer diameter of the wheel so that the moldable, synthetic resin material can be properly guided into the spacing therebetween.

It is a further object of this invention to provide a method and apparatus, as aforesaid, wherein the assembly of the bearing assembly into the hole of the wheel can be performed by a minimum of operating personnel.

It is a further object of this invention to provide a method and apparatus, as aforesaid, which is easily maintained and effects a very rapid production of wheel assemblies.

It is a further object of this invention to provide a method and apparatus, as aforesaid, which effectively reduces the unit of assembly time per operating personnel per wheel assembly.

SUMMARY OF THE INVENTION

In general, the objects and purposes of the invention are met by providing a method and apparatus for assemblying a bearing assembly into the hole normally provided in a wheel, which hole is of a larger diameter than the periphery of the bearing assembly and effecting an alignment of the center of the outer diameter of the wheel with the axis of rotation of the bearing assembly and then effecting a supply of moldable, synthetic resin material to the spacing between the periphery of the bearing assembly and the inner wall of the hole to effect, upon a congealing of the moldable, synthetic resin material, a securement of the bearing assembly in the hole in the wheel and assuring that the center of the outer diameter of the wheel is concentric with the axis of rotation of the bearing assembly.

BRIEF DESCRIPTION OF THE DRAWINGS

Further objects and purposes of this invention will be apparent to persons acquainted with apparatus of this general type upon reading the following specification and inspecting the accompanying drawings, in which.

Certain terminology will be used in the following description for convenience and reference only and will not be limiting. The words, "up", "down", "right" and "left" will designate directions in the drawings to which reference is made. The words "in" and "out" will refer to directions toward and away from, respectively, the geometric center of the device and designated parts thereof. Such terminology will include the words above specifically mentioned, derivatives thereof and words of similar import.

DETAILED DESCRIPTION

Figure 1:
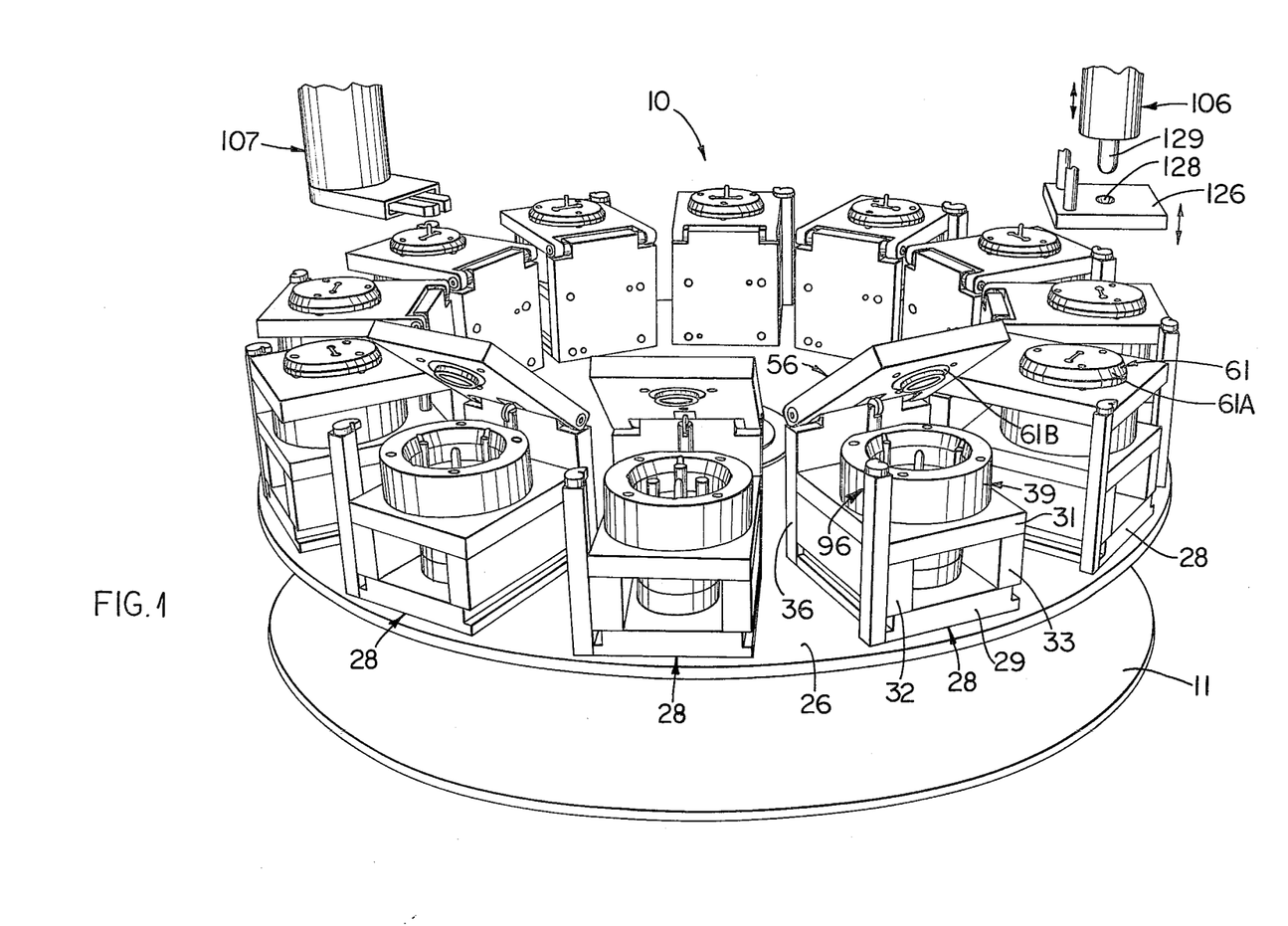
FIG. 1 is a perspective view of an apparatus embodying the invention.

The wheel assembly apparatus 10 is illustrated in FIG. 1 and comprises a base plate 11 and a mounting plate 12 mounted on the upper surface of the base plate 11, which mounting plate 12 supports a central upstanding post 13 thereon. The post 13 has a central opening 14 therein which opens downwardly through the mounting plate 12 and base plate 11 through aligned openings 16 therein. The outer periphery of the post 13 has an upwardly facing lip 17 thereon spaced upwardly from the upper surface of the mounting plate 12.

An annulus 18 encircles the post 13 above the upwardly facing lip 17 and has bearings 19 disposed between the radially inner surface of the annulus 18 and the outer periphery of the upper portion of the post 13 to rotatably support the annulus 18 with respect to the post 13. The lowermost bearing 19 is supported on the upwardly facing lip 17.

An indexing mechanism 21 is mounted on the mounting plate 12 and comprises a power drive mechanism 22 which drives through a connecting device 23 an annular ring 24 for reciprocal motion about the axis thereof which coincides with the axis of the annulus 18 and the axis of the opening 14 in the upstanding post 13. The annular ring 24 is connected to the annulus 18 so that the indexing mechanism effects a step-by-step rotating motion of the annulus 18.

A table 26 is mounted on the upper surface of the annulus 18 and is secured thereto by a plurality of bolts 27. The table 26, in this particular embodiment, is circular in shape and the plane thereof is generally parallel to the plane of the base plate 11 but spaced upwardly therefrom the above the annular ring 24. The bearings 19 are held in position on the post 13 by a plate 25 secured to the post by screws 30.

A plurality of mold support devices 28 are mounted on the upper surface of the table 26. Each mold support 28 comprises a first plate 29 which is fixably secured to the upper surface of the table 26 and a second plate 31 spaced thereabove and separated from the first plate 29 by a pair of horizontally spaced blocks 32 and 33 so that a clearance space 34 is provided between the plates 29 and 31 and between the pair of blocks 32 and 33. A back plate 36 is secured to the upper surface of the table 26 along the radially most inner edge of the plates 29 and 31. The plate 36 extends upwardly and has a pair of horizontally spaced cut-outs 37 adjacent the upper lateral edges thereof to expose a pair of bearing members 38 which are mounted in the cut-outs 37.

Figure 11:
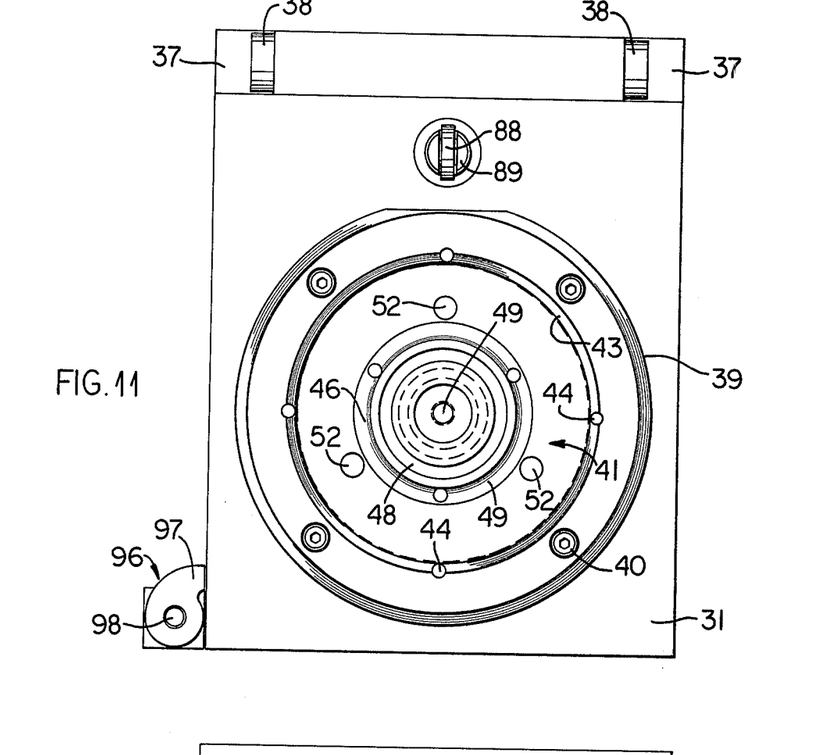
FIG. 11 is a top view of a mold embodying the invention with the cover removed therefrom.

A mold 39 is secured to the upper surface of the plate 31 by a plurality of screws 40 (FIG. 11). The mold 39 has a mold cavity 41 therein which, in this particular embodiment, is circular in cross section as illustrated in FIG. 11. The mold cavity 41 has a bottom wall 42 and a circular-shaped upstanding side wall 43. The upstanding side wall 43 has a plurality of grooves 45 therein adapted to receive guide pins 44 which extend through correspondingly aligned openings in the plate 31. The guide pin 44 extends radially inwardly into the mold cavity 41.

The bottom wall 42 of the mold cavity 41 has an opening therein receiving a support plate 46 which has upwardly facing annular supporting surfaces 47 and 48 at differing elevations within the mold cavity and concentric with the axis of a removable guide pin 49. The removable guide pin 49 is mounted at the central portion of the support plate 46 and at the central portion of the mold cavity 41 and extends upwardly from the upper surface of the support plate 46. In this particular embodiment, the radially innermost surface of the guide pins 44 define a circle, the center of which is coaxial with the axis of the guide pin 49.

A plurality of holes 51 are spaced around the axis of the pin 49, in this particular embodiment, three such holes 51 equally spaced around the axis of the pin 49, are provided in the plate 31 and in the bottom wall 42 of the mold cavity 41. Each of the holes 51 is adapted to receive an ejector pin 52 which is vertically reciprocal therein. The lower end of each of the ejector pins 52 is secured to a plate 53 which is, in turn, connected to a rod 54 having a roller 55 on the lower end thereof. The purpose of the ejector mechanism 50 will be explained in detail below.

A cover 56 is comprised of a generally flat plate having a pair of flanges 57 and 58 horizontally spaced along one edge thereof. The inwardly facing surfaces of the flange 57 have bearings 59 thereon which are adapted to be aligned with the bearings 38 on the upper edge of the back plate 36. Pins are receivable through the flanges 57 and 58 as well as the bearings 38 and 59 to effect a pivotal securement of the cover 56 to the upper edge of the back plate 36.

A nozzle device 61 is mounted on the cover 56. The nozzle device 61 comprises two parts 61A and 61B each having a passageway system illustrated in FIG. 6, for example, and includes a pair of parallel upwardly tapered bores 62 extending through both parts 61A and 61B of the nozzle device 61 and terminating at the lower end of the lower part 61B in orifices 64 (see FIG. 13). The upper ends of the upwardly tapered bores 62 in the upper part 61A are connected together by an upwardly exposed feeder passageway 63. The diameter of the tapered portion of each of the bores 62 in the upper part 61A is greater than the tapered bores 62 in the lower part 61B to define a step 61C in each of the bores 62 at the location where the upper part 61A engages the upper surface of the lower part 61B.

Figures 6, 13:
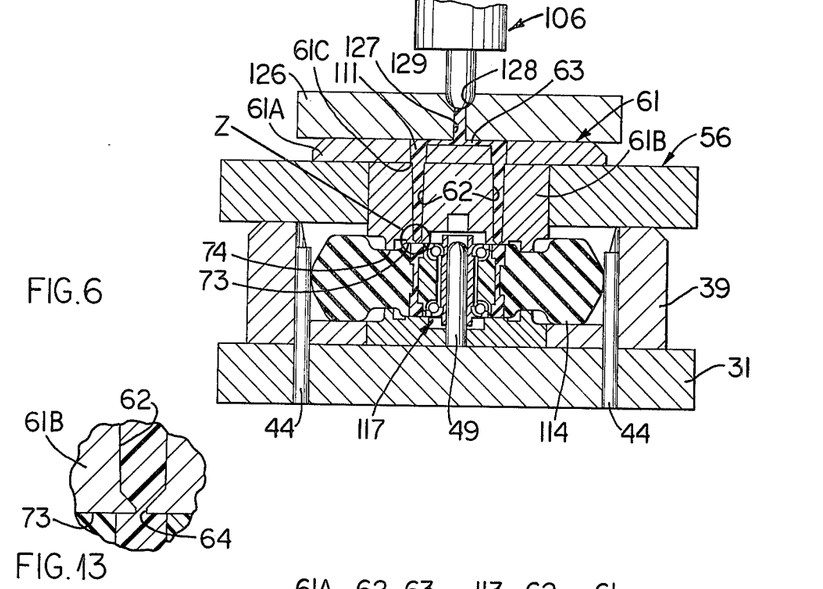
FIG. 6 is a sectional view taken along the line VI—VI of FIG. 2.
FIG. 13 is an enlarged view of the encircled portion "Z" in FIG. 6.
Figure 7:
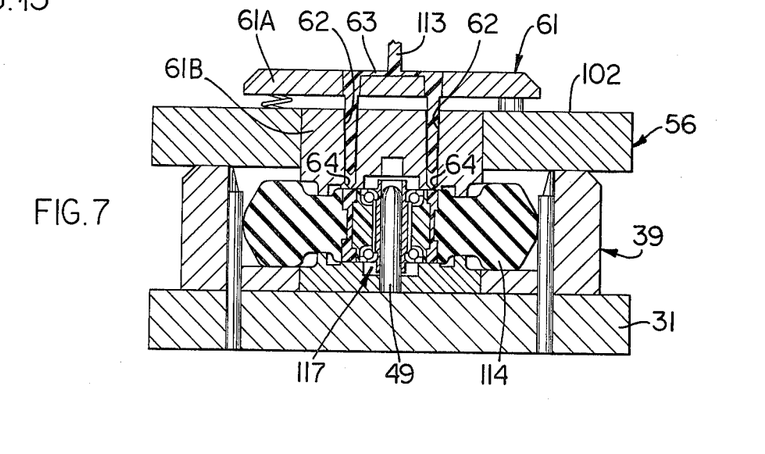
FIG. 7 is a view similar to FIG. 5 immediately following an injection of moldable synthetic resin material into the spacing between the bearing assembly and the inner wall of the hole in the wheel.

The nozzle device 61 is mounted in a guide opening 68 and the upper part 61A is adapted to reciprocate vertically relative to the lower part 61B. The lower part 61B is fixedly secured to the cover 56 by any convenient and not illustrated means. The bottom side of the lower part 61B of the nozzle device 61 which faces the mold cavity 41 when the cover 56 is in the closed position as illustrated in FIGS. 6 and 7, for example, comprises a central recess 71 having a central hole 72 therein and a plurality of surfaces 73 and 74 at varying heights in the central recess 71, all concentric with the axis of the pin 49. The surface 73, for example, is vertically opposite the supporting surface 48 on the plate 46 in the bottom wall 42 and the surface 74 is vertically opposite the supporting surface 47 on the support plate 46.

A plurality of guide bores 76 are spaced around the guide opening 68. Each of the guide bores 76 has a shoulder 77 therein. A bolt 80 having a thread 78 thereon is threadedly engaged in a threaded opening in the radial rim 79 of the upper part 61A on the nozzle device 61. The bolt 80 has an enlarged head which engages the shoulder 77 to limit the upward movement of the upper part 61A relative to the cover 56. The undersurface 83 of the radial rim 79 has a plurality of equally spaced recesses 82 therein aligned with correspondingly equally spaced recesses 81 in the upper surface of the cover 56. The aligned recesses 81 and 82 are adapted to receive a spring 83 to urge the upper part 61A of the nozzle device 61 upwardly relative to the cover 56 and the lower part 61B so that the enlarged head on the bolt 80 is engaged with the shoulder 77. In this particular embodiment, the orifices 64 open outwardly in the surface 73 as illustrated in FIG. 12.

Figure 4:
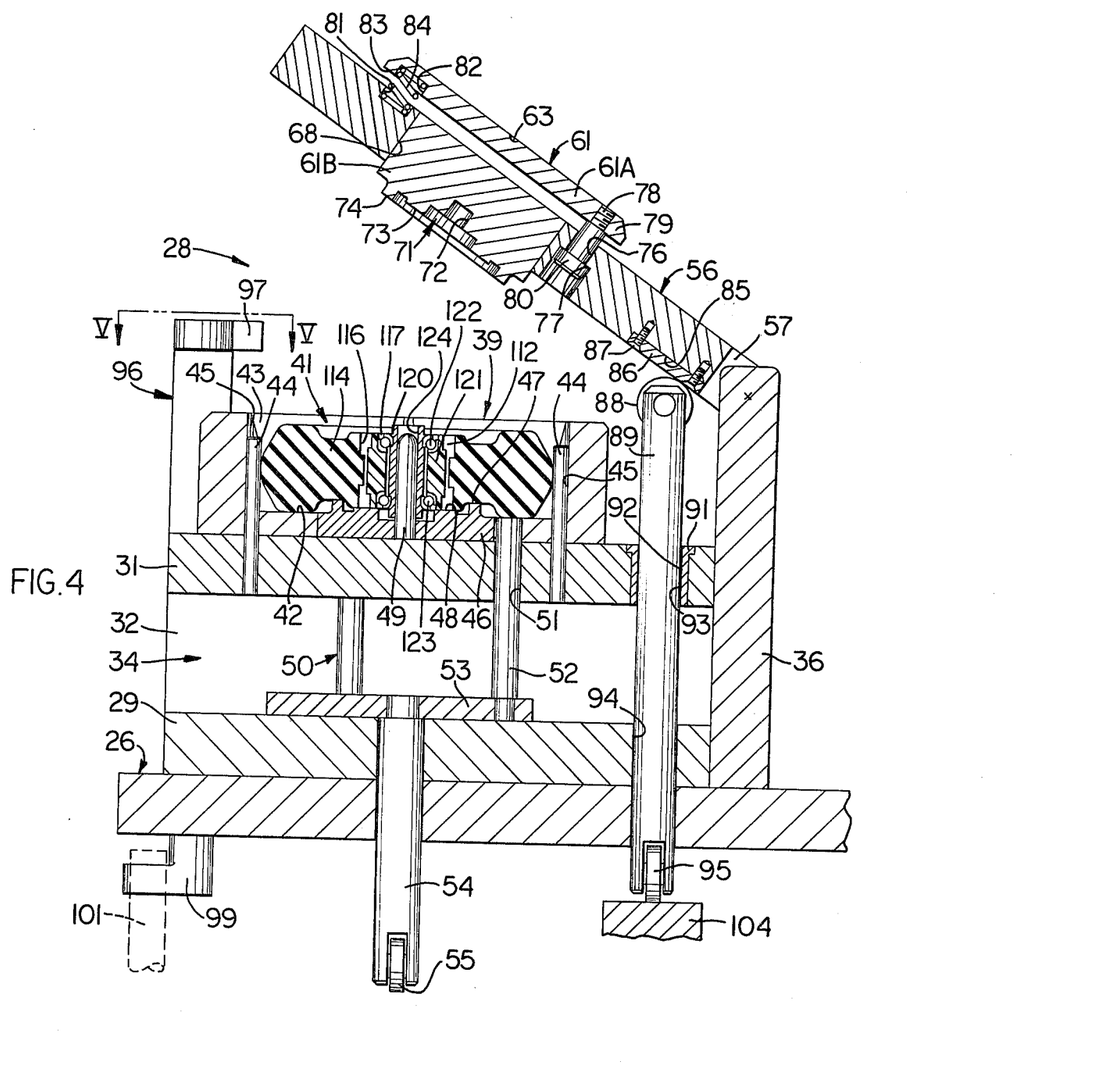
FIG. 4 is a sectional view taken along the line IV—IV of FIG. 2.
Figure 12:
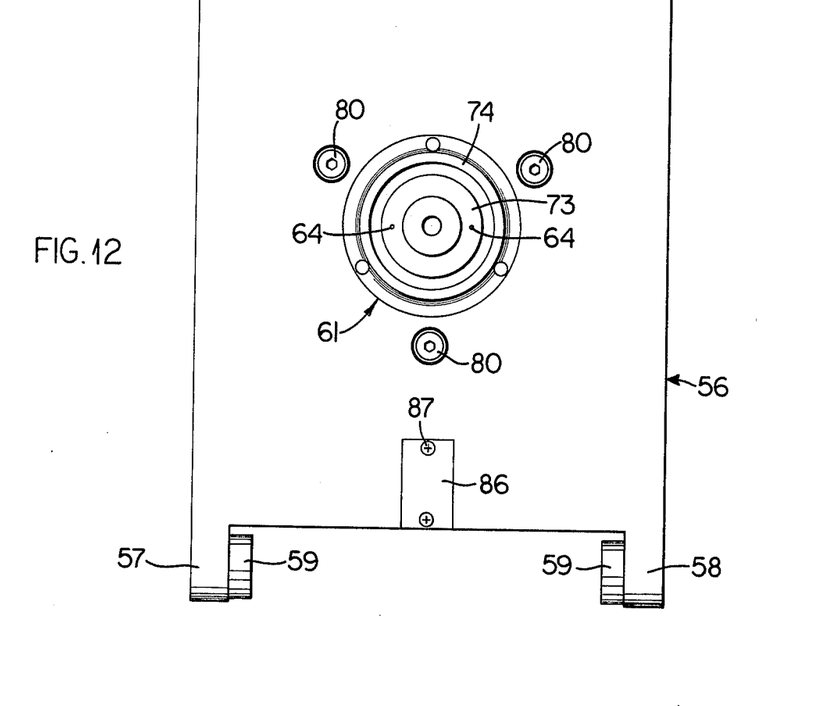
FIG. 12 is a bottom view of the cover removed from the mold illustrated in FIG. 10.

A recess 85 is provided in the central portion of the undersurface of the cover 56 between the flanges 57 and 58 and is adapted to receive a wear plate 86 therein as illustrated in FIGS. 4 and 12. The wear plate 86 is secured in the recess 85 by screws 87. The wear plate 86 is adapted to be engaged by a roller 88 mounted on the upper end of a vertically reciprocal rod 89 which is guided by a bushing 91 having an opening 92 therein, which bushing is received in a hole 93 in the plate 31. The rod 89 extends downwardly through aligned openings 94 in the plate 29 and table 26 and terminates in a roller 95.

Figure 5:
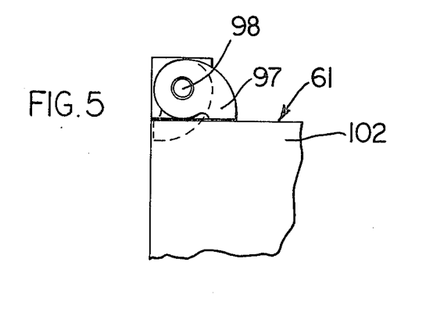
FIG. 5 is an enlarged view of the encircled portion "X" in FIG. 2.
Figure 9:
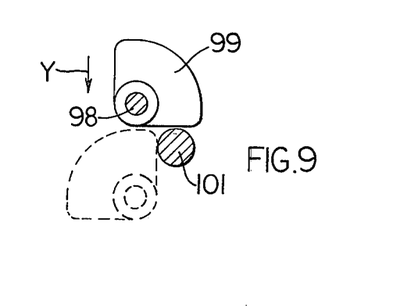
FIG. 9 is a sectional view taken along the line IX—IX of FIG. 3.
Figure 10:
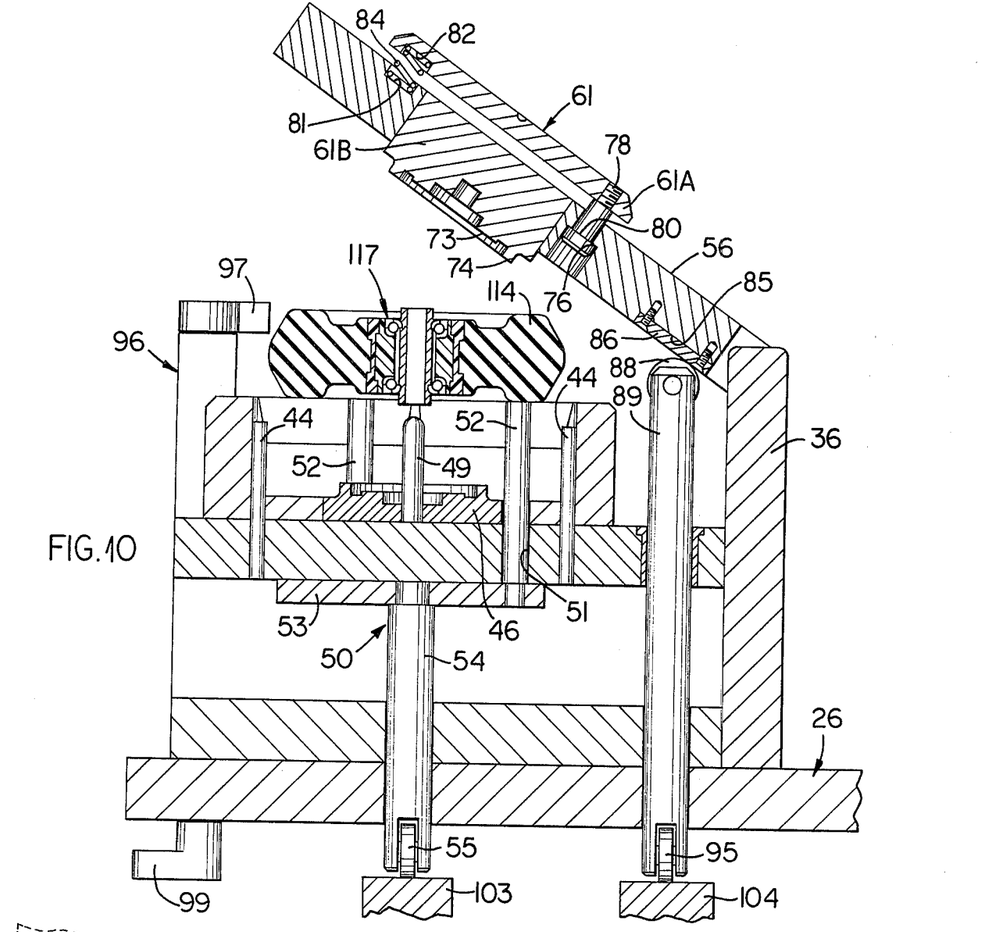
FIG. 10 is a sectional view taken along the line X—X of FIG. 2.

When the cover 56 of the mold is in the closed position as illustrated in FIGS. 6 and 7, for example, the cover 56 can be locked in the closed position by a mold lock 96. The mold lock 96 is comprised of a latch 97 which is adapted to pivot about the axis of a vertically reciprocal rod 98 to overlap the upper surface 102 of the cover 61 as illustrated in broken lines in FIG. 5. The rod 98 extends downwardly along the radially outermost edge of the plates 29 and 31 and extends through an opening (not illustrated) through the table 26 and terminates in a lever 99. An abutment 101 is secured to the base plate 11 or any other suitably fixed device so that upon a relative movement of the table 26 (in the direction of the arrow Y in FIG. 9, for example) carrying the level 99 therewith, the lever 99 will be pivoted to the broken line position illustrated in FIG. 9. This will effect a movement of the latch 97 from the broken line position illustrated in FIG. 5 to the solid line position thereof.

Figure 2:
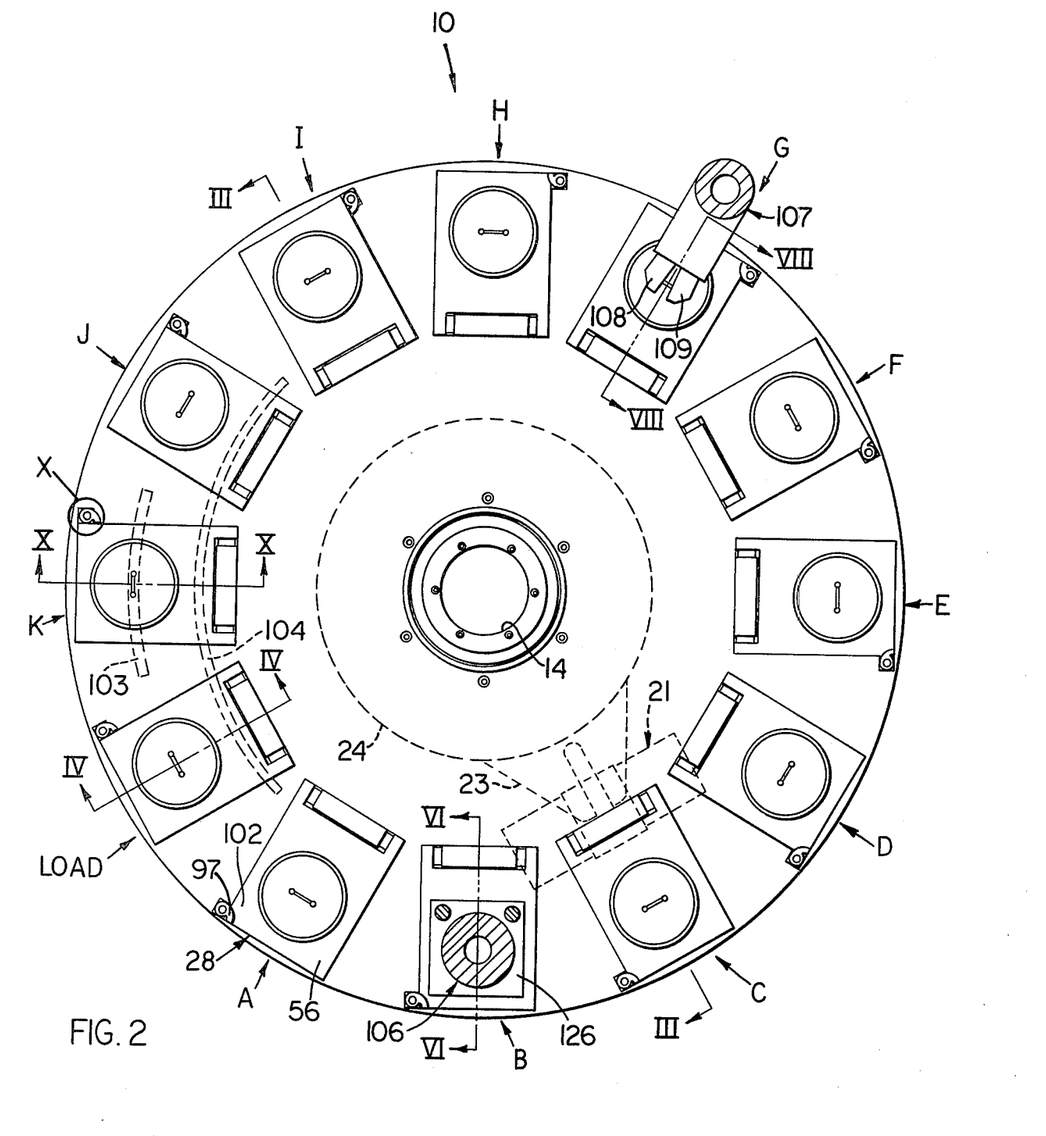
FIG. 2 is a top plan view of the apparatus.

Cam surfaces 103 and 104 extend in an arc, the center of which corresponds with the center of the rotatable table 26. The cam 103 engages the roller 55 on the rod 54. The cam 104 engages the roller 95 on the rod 89. In this particular embodiment, the cam 104 is longer than the cam 103. As illustrated in FIG. 2, the cam 104 extends beneath the equivalent of three mold supports 28 whereas the cam 103 extends only below one such mold support. The purpose of this construction will be explained below.

Figure 8:
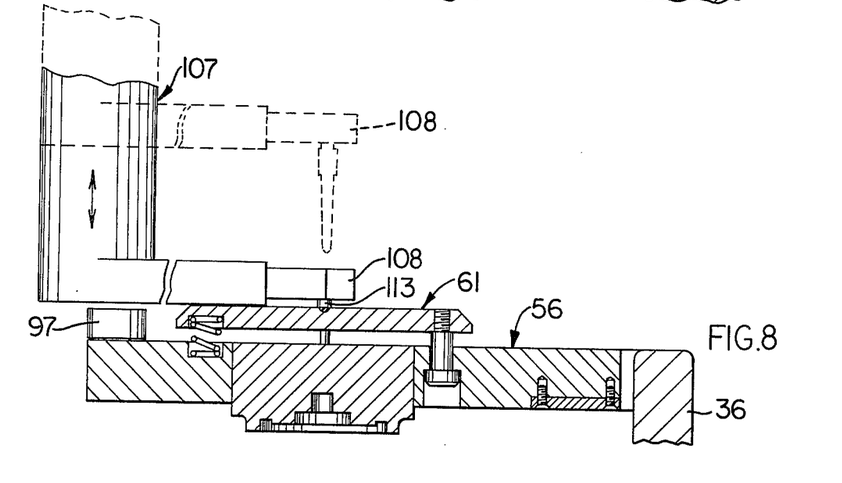
FIG. 8 is a sectional view taken along the line VIII—VIII of FIG. 2.

An injection molding machine 106 (FIG. 1) is adapted to move vertically into and out of engagement with the upper part 61A of the nozzle device 61 at one indexed location of a mold support 28, particularly the bores 62 and the feeder channel 63 and to inject synthetic resin material into the nozzle device 61. The injection molding machine 106 includes a clamp plate 126 (FIG. 6) having a downwardly tapered opening 127 therethrough aligned with the feeder channel 63. The upper surface of the plate 126 has any convenient surface to mate with a known injection molding machine. In this embodiment, the upper surface of the plate 126 has a spherical recess 128 to receive the nozzle 129 on the injection molding machine. The clamp plate 126 is supported by structure not illustrated for movement vertically independent of of the vertical movement of the injection molding machine 106. In addition, a puller device 107 is spaced radially around the table away from the injection molding machine 106. The puller device 107 has a pair of fingers 108 and 109 (FIG. 2) which are adapted to move toward and away from each other to grip congealed synthetic resin material to effect a removal thereof from the upper surface of the nozzle device 61. In this particular embodiment, the puller device 107, including the fingers 108 and 109, is movable vertically relative to the upper surface of the nozzle device 61 as illustrated in broken lines in FIG. 8.

OPERATION

Although the operation of the device described above will be understood from the foregoing description by skilled persons, a summary of such description is now given for convenience.

The apparatus described above is adapted to assemble a bearing assembly 117 having bearings therein into the simple opening of a wheel. In this particular embodiment, the bearing assembly 117 is mounted in the central opening 116 of a wheel 114. An axle 120 extends through the bearing assembly 117 and has an opening 124 therethrough. The bearing assembly 117 is identical to the bearing assembly described and illustrated in my U.S. Pat. No. 3,807,817. The bearing assembly 117 includes a hollow, thermoplastic sleeve 121 of selective degrees of hardness and resiliency which is mounted in the central opening 116 of the wheel 114. Bearings 122 and 123 are positioned, as described in my aforementioned patent, between the axle 120 and the sleeve 121. In this particular arrangement, the central opening 116 in the wheel 114 has a larger diameter than the outer periphery of the sleeve 121.

Figure 3:
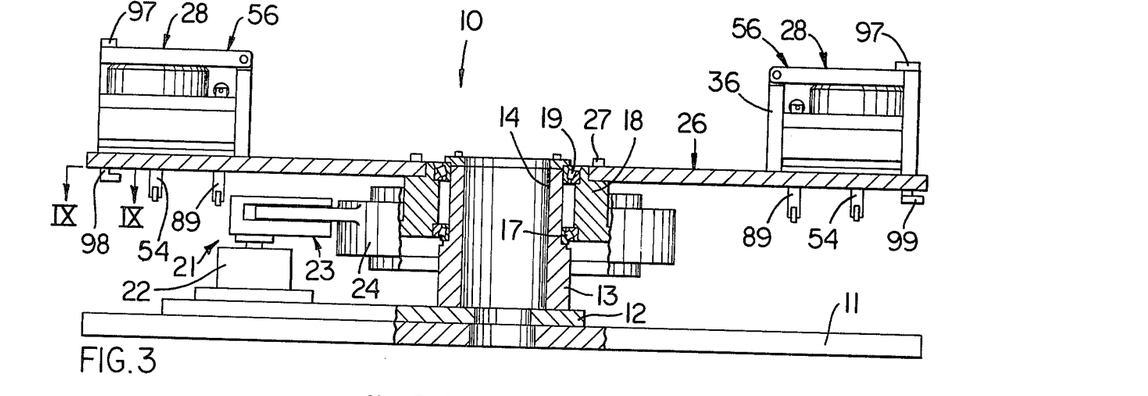
FIG. 3 is a sectional view taken along the line III—III of FIG. 2.

The bearing assembly 117 is preassembled at a location spaced from the described apparatus. The bearing assembly 117 is then brought to the described apparatus and the axle 120 having the opening 124 therethrough is placed over the pin 49 as illustrated in FIG. 3. The lower end of the sleeve 121 engages the upwardly facing surface 48 on the support plate 46 and the radially outer periphery of the sleeve 121 is spaced inwardly from the orifices 64 in the surface 73 in the nozzle device 61 on the cover 56. The purpose of this arrangement will be explained below. Next a wheel 114 having a central hole 116 therein of greater diameter than the outer periphery of the sleeve 121 is inserted into the mold cavity 41 and the outermost periphery thereof is engaged by the guide pins 44 to locate the center of the outer diameter of the wheel 114 coaxial with the axis of the pin 49. The exact position of the center of the opening 116 relative to the outer diameter of the wheel 114 is not critical. As a result, the outer periphery of the wheel 114 is rendered coaxial with the axis of rotation of the bearing assembly 117 independent of the location of the center of the hole 116. The inner surface of the central hole 116 is spaced radially outwardly from the orifices 64.

Referring to FIG. 2, the bearing assembly 117 and the wheel 114 are inserted into the mold cavity at the location indicated by the legend "LOAD". It is to be noted that the cam 104 is in engagement with the roller 94 so that the rod 89 is raised upwardly to keep the cover 56 in the raised position as illustrated in FIG. 4.

During this time, the indexing mechanism 21 is operating and the power drive 22 is effecting a timed sequence of movement for the table 26. Upon movement of the table 26 by reason of the indexing mechanism 21 advancing each mold support 28 between the positions A to K and LOAD illustrated FIG. 2, the roller 95 will roll off from engagement with the cam 104 and the mold support 28 will move to the next position A illustrated in FIG. 2. In this position, the cover 56 is in the closed position and the latch 97 is moved by an abutment not illustrated to overlap the upper surface 102 of the cover 56 to hold the cover in the closed position. Generally, however, the cover 56 is made of a sufficiently heavy material so that the weight alone of the cover 56 will keep the cover in the closed position and apply the desired amount of force on the upper surface of the bearing assembly 117 and the upper surface of the wheel 114. More specifically, the surfaces 73 and 74 on the lower part 61B of the nozzle device engage the upper surface of the bearing assembly 117 and the wheel 114 to tightly clamp the bearing assembly 117 and the wheel 114 in the mold cavity 41. After one more cycle of operation of the indexing mechanism 21, the mold section 28 is moved to position B illustrated in FIG. 2 so that the feeder channel 63 is aligned with the outlet opening 127 from the clamping plate 126 on the injection molding machine 106. A control device is activated based upon the appearance of a mold support 28 at the indicated position B to effect a downward movement of the clamping plate 126 into engagement with the upper part 61A of the nozzle device 61 as illustrated in FIG. 6. Thereafter, the nozzle 129 of the injection molding machine 106 is lowered into engagement with the spherical recess 128 in the clamping plate 126 and injects a quantity of moldable, synthetic resin material 111 into the feeder channel 63 and the bores 62 and out through the orifices 64. Since the opening 116 and the center of the wheel 114 is greater in diameter than the outer periphery of the sleeve 121, a spacing 112 is provided and the synthetic resin material is injected into the spacing 112 as illustrated in FIG. 6. Since the upwardly facing surface 48 on the support plate 46 and the surface 73 on the nozzle device 61 blocks off both axial ends of the space 112, the quantity of injected material is confined to the spacing 112. The quantity of moldable, synthetic resin material is controlled to avoid unnecessary waste. The air which is in the spacing 112 is permitted to bleed past the axial ends of the wheel as the synthetic resin material 111 is injected therein. As the clamping plate 126 is moved into engagement with the upper part 61A of the nozzle device 61, the springs 84 become compressed and the underside of the upper part 61A engages the upper side of the lower part 61B to join the two sections of each of the bores 62. At the completion of the injection process, the nozzle 129 of the injection molding machine 106 is moved vertically away from the upper surface of the clamping plate 129. Thereafter, the clamping plate 126 is lifted from the nozzle device 61 so that the springs 84 will urge the undersurface 83 of the upper part 61A upwardly away from the upper surface 102 of the cover 56 and lower part 61B. Generally, the orifices 64 are of such a small diameter that the synthetic resin material will have congealed in this very small cross section prior to the upward movement of the upper part of the nozzle device 61. As a result, the congealed synthetic resin material will break cleanly along an axial face of the inserted synthetic resin material defined by the surface 73 on the nozzle device 61 (see FIG. 7). The synthetic resin material in the spacing 112 will have not yet congealed. A spike 113 will remain on top of the nozzle device 61 since the synthetic resin material in the downwardly tapered opening 127 in the clamping plate 126 will remain attached to the core of material in the feeder channel 63 and bores 62 and extend upwardly therefrom. The downward taper of the opening 127 will facilitate an easy breaking free of the material from the wall of the opening 127.

The indexing mechanism 21 will subsequently effect an indexing of the table through successive steps to bring the mold support 28 to positions C, D, E, F and eventually to position G. In addition, and during this same period of time, additional bearing assemblies 117 and wheels 114 are inserted into the mold cavity 41 in the manner described above at the LOAD position.

During the period of time between position B and position G, the synthetic resin material in the spacing 112 is in the process of congealing. The material that remains in the passageway system comprising the feeder channel 63 and the bores 62 has, due to its small cross section, congealed at position G. In position G, a puller device 107 having the fingers 108 and 109 thereon is adapted to move so that the fingers 108 and 109 straddle the spike 113. Operation of the puller device 107 will effect a pinching of the spike 113 between the fingers 108 and 109 to firmly grip the spike 113 therebetween. Thereafter, the puller device 107 will move vertically upwardly to remove the spike 113 as illustrated schematically in FIG. 8. The spike 113 is discarded at any convenient location. As a result, the passageway system comprising the feeder channel 63, the bores 62 and orifices 64 is now open for injection of new synthetic resin material at position B.

The cover 56 of the mold support 28 remains in the closed position during a proper indexing of the table between positions G, H and I. However, during a movement of the mold support 28 from position H to position I, the locking device 96 is unlocked by reason of the lever 99 (FIG. 9) coming into contact with an abutment 101 to effect a pivoting of the rod 98 and lever 99 so that the lever becomes oriented in the broken line position (FIG. 9) after movement thereof past the abutment 101. This will effect a movement of the latch 97 from the broken line position in FIG. 5 to the solid line position to unlock the cover 56. Between positions B and I, the corresponding cycles of operation of the indexing mechanism 21 will determine a period of time and if the synthetic resin material in the spacing 112 has completely congealed at position I, the table is indexed at the proper speed. If the synthetic resin material in the spacing 112 has still not yet completely congealed, the indexing mechanism 21 is operating too fast and the period thereof must be slowed down. It is preferable, however, to adjust the indexing mechanism so that the synthetic resin material of the spike 113 at position G will have just congealed so that it can be effectively removed by the puller device 107. Thereafter, an indexing of the table 26 to position J will move the roller 95 into engagement with the cam 104. This will effect a vertical movement of the rod 89 to the position illustrated in FIG. 9 to lift the cover 56. During the next cycle of operation of the indexing mechanism 21, the mold support 28 will move to position K wherein the roller 55 will engage the cam 103 to operate the ejector mechanism 50. A vertical movement of the rod 54 of the ejector mechanism 50 will effect a vertical movement of the ejector pins 52 in the openings 51 in the plate 31 and bottom wall 42 of the mold 39. This will effect a lifting of the assembled wheel 114 and bearing assembly 117 to the position illustrated in FIG. 9. At this location, the assembled wheel 114 and bearing assembly 117 can be removed from engagement with the upper end of the ejector pins 52. Thus, and during the next movement of the turntable 26 back to the LOAD position, the ejector mechanism 50 will retract due to the roller 55 becoming disengaged from cam 103 and a new bearing assembly 117 and wheel 114 can be inserted into the mold cavity 41 as described above.

It has been discovered that the synthetic resin material in the spacing 112 between the bearing assembly 117 and the inner surface of the central hole 116 of the wheel 114 and the material in the spike 113 takes approximately 30 to 45 seconds to congeal. Since there are six positions B through G between the injection molding machine 106 and the puller device 107, each indexing step can be spaced approximately five seconds apart. Of course, the indexing can be very precisely controlled to regulate the speed of operation to produce the desired result. The actual time required will be a function of the shot size or quantity of material in the spacing 112 and the material being used.

If a bearing assembly having a larger or smaller diameter central opening is to be utilized, the removability of the pin 49 will permit an insertion of a new pin of the desired diameter.

The central hole 14 in the post 13 and hole 16 in the mounting plate 12 and base plate 11 permit auxiliary equipment to be mounted on the table and supplied with power or cooling water, for example, through the central opening.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. In an apparatus for use in assemblying a bearing assembly in a wheel having a hole in the center thereof of a diameter greater than the outer diameter of said bearing assembly, said bearing assembly including an axle, a sleeve spaced radially outwardly from said axle and having at least a small amount of resiliency and bearing means positioned between said axle and said sleeve to facilitate a relative rotation between said axle and said sleeve, the improvement comprising:

mold means having a bottom part with means defining a cavity therein and a cover part movable between opened and closed position relative to said cavity;

first alignment means defining a central axis in said cavity, said first alignment means supporting said bearing assembly in said cavity and in a position wherein the central axis of said bearing assembly is coaxial with said central axis of said first alignment means;

second alignment means in said cavity supporting said wheel to effect a placement of the center of the outer diameter of said wheel in coaxial relationship with said central axis of said first alignment means;

nozzle means on said mold means aligned with the spacing between said sleeve of said bearing assembly and the internal wall surface of said hole in said wheel when said cover means is in said closed position;

means on said bottom part and said cover part of said mold means effecting an axial compression of said resilient sleeve of said bearing assembly in response to a closing of said cover part to form an annular seal between said sleeve and said mold means at both axial ends thereof; and supply means supplying a moldable, synthetic resin material to said nozzle means and the spacing to effect, upon a congealing of said moldable, synthetic resin material, a securement of said bearing assembly in said hole in said wheel, said seal preventing a flow of said resin material therepast thereby maintaining said bearing means free of contamination by said resin material.

2. An apparatus according to claim 1, wherein said nozzle means is mounted on said cover part and is movable therewith; and wherein said nozzle means includes means defining a passageway in said cover part providing communication between the exterior of said cover part and said spacing.

3. An apparatus according to claim 1, including a rotatably supported turntable;

wherein said mold means includes a plurality of individual molds mounted on said turntable and movable therewith; and indexing means effecting a step-by-step indexing of said turntable to bring successive ones of said mold means and said nozzle means thereon into alignment with said supply means.

4. An apparatus according to claim 3, wherein said turntable includes control means sequentially operatively connected to said cover part in response to an indexing of said turntable to predetermined locations for effecting a movement of said cover part between said opened and closed positions.

5. An apparatus according to claim 4, wherein said supply means is located at one of said predetermined locations; and wherein said control means effects a closing of said cover part of at least one of the mold means prior to movement thereof to said one predetermined location.

6. An apparatus according to claim 5, wherein said nozzle means is mounted on said cover means and is movable therewith.

7. An apparatus according to claim 5, including removing means at another of said predetermined locations spaced from said supply means in the direction of rotation of said turntable for removing congealed synthetic resin material from said cover parts adjacent said nozzle means.

8. An apparatus according to claim 4, wherein said control means includes a pair of spaced members, one member causing said cover part to open and the other member causing said cover part to close;

wherein said turntable further includes ejection means at one of said predetermined locations and being located adjacent and between said pair of members of said control means for effecting an ejection of an assembly comprising said wheel secured to said bearing assembly by congealed synthetic resin material therebetween from said cavity.

9. An apparatus according to claim 8, wherein said control means effects an opening and a closing of said cover part only prior to and after, respectively, an operation of said ejection means during one rotation of said turntable to facilitate not only the removal of said assembly but also the insertion of a new bearing assembly with bearing means therein and a wheel into said cavity.

10. An apparatus according to claim 1, wherein said means on said bottom part and said cover part also effects an axial compression of the portion of said wheel adjacent said hole but insufficient to create a seal thereat, the air initially contained in said spacing being permitted to escape between said means on said bottom part and said cover part of said mold means and said wheel to thereby facilitate the simultaneous introduction of said resin material into said spacing.

* * * * *